UNITED STATES PATENT OFFICE.

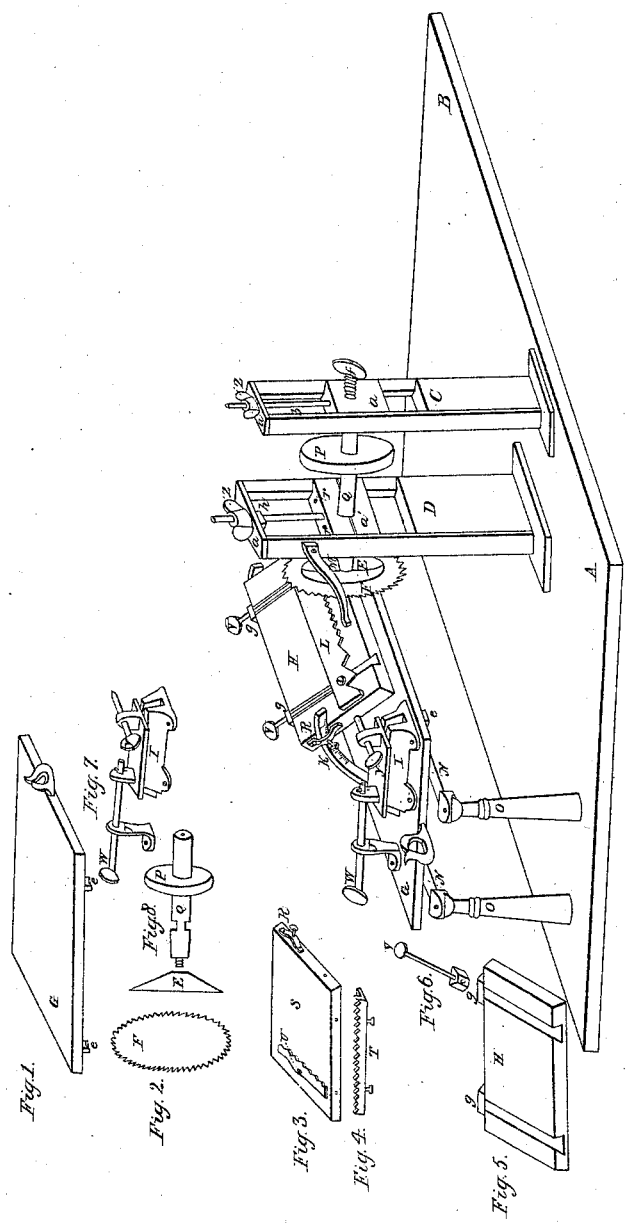
W. Redheffer,
Making Combs.
N° 2,679.   Patented June 18, 1842.

WILLIAM REDHEFFER, OF PHILADELPHIA COUNTY, PENNSYLVANIA.

MACHINE FOR SLITTING TORTOISE-SHELL FOR MAKING COMBS.

Specification of Letters Patent No. 2,679, dated June 18, 1842.

*To all whom it may concern:*

Be it known that I, WILLIAM REDHEFFER, of the county of Philadelphia and State of Pennsylvania, have invented a new and useful machine in the art of comb-making, styled a "weld fitting and slitting machine," for the purpose of slitting the thick tortoise-shell into pieces the required thickness for different qualities of side, puff, and all other combs, and the same for fitting laps for welds when the nature of the welds are an angle of any degrees or part of a degree, the pieces being slit off instead of shaving or scraping them to a proper fit; and that the following is a full, clear, and exact description of the construction and operation of the same, reference being had to the annexed drawing, making a part of this specification, in which—

Plate, 1, perspective view of the machine; Figure 5, the plane used for fitting laps for welds; Fig. 3, the plane for slitting; Fig. 4, the catch to Fig. 3; Fig. 2, sections of the mandrel plate and saw; Fig 7, sections of the dovetail slides; Fig. 8, the regulating screws and nuts; Fig. 9, the carriage.

A, B, the base; D, C, the head; $a''$, $a$, their boxes; P, the pulley; Q, the mandrel; E, the plate to which the saw F is soldered; $f$, the screw passing through the box $a$; $b$, $b$, the rods connected to the boxes, $a''$, $a$; Z, Z, the nuts to the rods; O, O, the posts; N, N, the rails; G the carriage; I the slides; M the spring; Y, the horizontal screw passing into the bower ends of the planes; L the catch to the plane H; V V the thumb screws passing through the nuts, $g$ $g$, to regulate the catch L; K K the quadrants to support the upper part of the planes; R the ears to the planes H, and S; J the nuts to admit the regulating thumb screws, W.

To enable others skilled in the art to make and use my invention, I will proceed to describe its construction and operation.

A, B, the base of any suitable material. Upon this base are the heads, D and C, and are fastened to it with screw bolts or otherwise. These heads have each a box, the box $a$, has a screw $f$ through it steel pointed so as to suit the mandrel. The box, $a''$, is divided so as to let the mandrel in and out, and is held together with screws Y. The boxes $a''$ $a$, which hold the mandrel Q, can be raised or lowered with the connecting rods $b$ $b$, passing through the tops of the heads having the thumb nuts Z, Z. The tops of these heads $a$, $a$, are made fast so that they can be taken off to let the boxes in or out when the boxes, $a''$, $a$, which holds the mandrel, are raised or lowered to any position necessary. They are made secure with the set nuts $h$ on the connecting rod $b$.

The mandrel Q works on a point and journal and is constructed thus: It has a plate, E, with a female screw to suit the male and is put on the reversed way from its motion when in action. By this means it is always kept tight to the mandrel. The back of this plate is turned down with a regular inclined plane from its center to its periphery, to a feather edge, and is faced somewhat concave. Then the saw, F, is soldered on the face of the plate, then turned down to the one-fiftieth of an inch, or less in thickness.

The plate, E, to which the saw is fastened is to support and keep the saw from doubling and acts as a wedge to open the pieces as the saw cuts. On the same base A B, are four posts, O O, two of which are not seen in the drawings, opposite and on parallel lines front of the saw. These posts pass through the base resting on their shoulders and are made secure with nuts underneath the base. Upon these posts the rails N N, are laid, and are made fast with screws passing through their ends into the tops of the posts. Upon these rails the carriage, G, moves in grooves, $e$ $e$, to suit the rails. The carriage is held to its position by means of a catch at each side of it. At each end of this carriage there is a dovetail slide, I, through the tops of these slides is a horizontal screw Y passing into the planes H or S, at their lower ends, acting as centers to them. These planes have an ear, R, at each end of them with a set screw, $t$, in each, and are attached to the carriage separately, according to the work to be done.

Fig. 3, for slitting. K the quadrants passing between the ears and the plane so when the plane has any angle given to it necessary it is fastened with the set screws, $t$, in the ears, R, to the quadrants. These quadrants, K, are fastened to the carriage at each end of it so as to let the plane move on its center to any position requisite. The plane, S, Fig. 3, has a catch the length of it bent up so as to suit the face of the plane as Fig. 4 and it is fastened to the lower edge of the plane, so that it can be set in or out, from the face of the plane. It has teeth in it like a saw, so as to hold the pieces from flying down.

There is another catch, U, left into the plane at its back end perpendicular to the former and is fastened to the plane. It has teeth in it also like a saw so as to prevent the pieces from reacting back when the saw is in operation. This catch, U, can be raised or lowered with a regulating screw from the back of the plane. The spring, M, is fastened to the front head, D. The end that is made to press against the plane is bent up so as to let the pieces pass under it with as little friction as possible. This spring is to hold the pieces on the plane and presses them straight for slitting. As the carriage is moved forward, this spring can be made to press with a greater or less degree against the plane according as it is loose or tightened to the front head.

The plane H, is used for fitting laps for welds. It has a catch, L, on its face the length of it with different size notches and teeth in them so as to hold the different shape corner pieces from flying up when the carriage is moved forward to cut the fits for welds. This catch is made to raise or lower with the thumb screws V, V, connected to it by means of slides (as Fig. 6) passing through this plane near its ends. These screws, V, V, pass through the nuts, $g$ $g$, at the top of this plane (as Fig. 5). These planes, H or S, according which is in use can be set at any exact distance required from the face of the saw by means of the regulating screws, W W. These screws are fastened to the slides (as Fig. 7). These regulating screws pass through the nuts, J, Fig. 8. These nuts are on a line with the slides and are fastened to the carriage G.

What I claim is—

The mechanical combination, and arrangement of the saw, with the mode of holding the pieces on the carriage, for slitting tortoise shells, as herein described.

WM. REDHEFFER.

Witnesses:
   Isaac Boileau,
   Thos. P. Potts.